US008332468B2

(12) United States Patent
Song et al.

(10) Patent No.: US 8,332,468 B2
(45) Date of Patent: Dec. 11, 2012

(54) METHOD AND SYSTEM FOR PROCESSING AN ADDRESS BOOK

(75) Inventors: Xuefei Song, Shenzhen (CN); Hao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 12/770,144

(22) Filed: Apr. 29, 2010

(65) Prior Publication Data

US 2010/0211634 A1 Aug. 19, 2010

Related U.S. Application Data

(63) Continuation of application No. PCT/CN2008/072873, filed on Oct. 29, 2008.

(30) Foreign Application Priority Data

Nov. 1, 2007 (CN) .......................... 2007 1 0166729

(51) Int. Cl.
*G06F 15/16* (2006.01)
*G06F 7/00* (2006.01)

(52) U.S. Cl. ........................................ 709/203; 707/621

(58) Field of Classification Search ............... 705/14.16; 709/203; 707/621
See application file for complete search history.

(56) References Cited

U.S. PATENT DOCUMENTS

| | | | | |
|---|---|---|---|---|
| 5,966,714 | A * | 10/1999 | Huang et al. | 1/1 |
| 6,393,434 | B1 * | 5/2002 | Huang et al. | 1/1 |
| 7,187,932 | B1 * | 3/2007 | Barchi | 455/445 |
| 7,280,502 | B2 * | 10/2007 | Allen et al. | 370/329 |
| 7,539,699 | B2 * | 5/2009 | Kobashikawa et al. | 1/1 |
| 7,853,560 | B1 * | 12/2010 | Sivalingham et al. | 707/611 |
| 2002/0120760 | A1 * | 8/2002 | Kimchi et al. | 709/230 |
| 2003/0065786 | A1 * | 4/2003 | Park et al. | 709/227 |
| 2004/0093317 | A1 * | 5/2004 | Swan | 707/1 |
| 2004/0266414 | A1 * | 12/2004 | Likwornik | 455/415 |

(Continued)

FOREIGN PATENT DOCUMENTS

CN 1558342 A 12/2004

(Continued)

OTHER PUBLICATIONS

Supplementary Search Report and Search Opinion of corresponding European Patent Application No. 08847647.8 , mailed Mar. 8, 2011, 6 pages total.

(Continued)

*Primary Examiner* — Jerry Dennison

(57) ABSTRACT

A method and a system for processing an address book are provided. The method includes the following steps. A network address book (NAB) parses a user address book, and generates an acquisition request according to settings of the user address book. The NAB acquires contact information to be updated according to the acquisition request, and updates the user address book. The NAB synchronizes or transmits updated information of the user address book to a piece of user equipment (UE). By using the method, plenty of contact information is acquired according to the user settings. Therefore, the method solves the problems that the address books in the conventional technology have single-purpose functions and closely related to services and thus cannot serve as an independent function for providing services for the user. In addition, address book information on a plurality of UEs of the user can be updated synchronously, so that when one UE initiates address book information update, the address books on other UEs are updated accordingly. Therefore, the consistency between the address book information on the UEs is guaranteed.

14 Claims, 8 Drawing Sheets

U.S. PATENT DOCUMENTS

2005/0120084 A1 6/2005 Hu et al.
2005/0243993 A1* 11/2005 McKinzie et al. ....... 379/355.04
2006/0080284 A1 4/2006 Masonis et al.
2006/0190622 A1* 8/2006 Kitada et al. .................. 709/245
2006/0240868 A1 10/2006 Kaplan et al.
2006/0242210 A1* 10/2006 Ring et al. .................... 707/204
2007/0061330 A1* 3/2007 Newton et al. .................. 707/10
2007/0067392 A1* 3/2007 Torres et al. .................. 709/206
2007/0189301 A1* 8/2007 Kiss et al. .................. 370/395.2
2007/0226204 A1* 9/2007 Feldman ........................... 707/5
2007/0280445 A1* 12/2007 Shkedi ....................... 379/93.23
2007/0288580 A1* 12/2007 Kaminsky et al. ............ 709/206
2008/0049919 A1* 2/2008 Pounds et al. ........... 379/201.04
2008/0108330 A1* 5/2008 O'Neil et al. .............. 455/414.1
2008/0177626 A1* 7/2008 Nguyen .......................... 705/14
2008/0243789 A1* 10/2008 Kussmaul et al. ................ 707/3
2008/0261566 A1* 10/2008 Descombes ................ 455/414.1
2009/0016508 A1* 1/2009 Krushnakant ............ 379/114.05
2009/0028179 A1* 1/2009 Albal ............................ 370/465
2010/0035635 A1* 2/2010 Shim .......................... 455/456.2
2010/0211634 A1* 8/2010 Song et al. .................... 709/203
2010/0251138 A1* 9/2010 Hardy et al. .................. 715/752
2010/0268742 A1* 10/2010 Ring et al. .................... 707/792
2011/0060632 A1* 3/2011 Sivalingham et al. ..... 705/14.16

FOREIGN PATENT DOCUMENTS

CN 1859113 A 11/2006
CN 1859322 A 11/2006
KR 20050097687 A 10/2005

OTHER PUBLICATIONS

Written Opinion of corresponding PCT Patent Application No. PCT/CN2008/072873, mailed Feb. 5, 2009, 4 pages total.

* cited by examiner

METHOD AND SYSTEM FOR PROCESSING AN ADDRESS BOOK

CROSS-REFERENCE TO RELATED APPLICATIONS

This application is a continuation of International Application No. PCT/CN2008/072873, filed on Oct. 29, 2008, which claims priority to Chinese Patent Application No. 200710166729.6, filed on Nov. 1, 2007, both of which are hereby incorporated by reference in their entireties.

FIELD OF THE TECHNOLOGY

The present invention relates to the field of communications technology, and more particularly to a method and a system for processing an address book.

BACKGROUND OF THE INVENTION

An address book is a list of phone numbers of contacts. When communication and computer technologies were underdeveloped, people can only record phone numbers of contacts on a notebook by handwriting, which is only capable of containing a limited amount of information, and is inconvenient for information updating. With the development of mobile communication and computer technologies, people can record the phone numbers of contacts on a storage medium of a mobile communication terminal or computer, which greatly facilitates the communication between people; meanwhile, the function and capacity of an address book are also increasingly enhanced with the development of various mobile communication services, for example, functions of providing presence information of contacts, and group and category of contacts. However, when a user has multiple pieces of user equipment (UE), the user needs to input the contact information to each UE, which is rather inconvenient for the user, and the consistency between the contact information on the UEs cannot be guaranteed when the data is updated. Therefore, it is an urgent task to provide a consistent address book for a plurality of UEs of a user, so as to provide better user experience.

Currently, many data services require support of an address book. For example, for Instant Message (IM) and Push to talk over Cellular (PoC) services, when sending an IM message or initiating a PoC call request, a user needs to initiate a request according to a user identity (ID) of a contact in an address book. In the conventional technology, address books for the IM and PoC services are implemented by a Shared List Extensible Markup Language (XML) Document Management Server (XDMS) at the network side, and a user of the IM and PoC services needs to install a relevant XDMS Client on a UE to access and edit the address book of the user. FIG. 1 shows the implementation architecture of an address book in the conventional technology.

Referring to FIG. 1, an XDM Client is adapted to access and edit a contact list provided on a Shared List XDMS; an Aggregation Proxy is adapted to authenticate an access and edition request of a user, and route the request to the Share List XDMS; and the Shared List XDMS is adapted to store and manage the contact list of the user. When the user accesses or edits his/her own contact list, the XDM Client may be used to initiate an access request by using an XML Configuration Access Protocol (XCAP)-related method, the request is authenticated by the Aggregation Proxy and then forwarded to the Shared List XDMS, and the Shared List XDMS completes the service request of the user, and returns a final execution result to the XDM Client of the user.

Moreover, in the conventional technology, a presence information-enabled address book also has similar address book functions. The presence information-enabled address book is a contact list that can conveniently display presence information of a presentity on a terminal. A user may use a UE to initiate a SUBSCRIBE request for subscribing to the presence information of the presentity to a presence information server by using a Session Initiation Protocol (SIP) SUBSCRIBE method. After the SUBSCRIBE request is authorized, the presence information server transmits a notification of presence information change of the presentity to the UE through an SIP NOTIFY method. After the UE receives the notification of the presence information change, the presence information is displayed on the presence information-enabled address book of the user.

The conventional technology has at least the following problems:

Both the contact list on the Shared List XDMS and the presence information-enabled address book in the conventional technology have single-purpose functions and closely related to services. Therefore, they cannot serve as an independent function for providing services for a user. In addition, when the user requires that the multiple functions described above need to be supported, various service clients must be installed on a UE. Moreover, when the user has a plurality of UEs, the conventional technology cannot ensure the consistency between the contact information on the UEs, especially the presence information of contacts. Because only the notification of presence information change of the contacts can be transmitted to UEs that have subscribed to the presence information, and UEs that have not subscribed to the presence information cannot receive the notification of the change in the presence information of the contacts.

SUMMARY OF THE INVENTION

Accordingly, the present invention is directed to a method and a system for processing an address book, so as to solve the problems that the address books in the conventional technology have single-purpose functions and closely related to services, enable the address book to serve as an independent function for providing services for a user, and ensure the consistency between address book information on a plurality of UEs of the user.

To achieve the objectives, in an embodiment, the present invention provides a method for processing an address book, which includes the following steps.

A network address book (NAB) parses a user address book, and generates an acquisition request according to settings of the user address book.

The NAB acquires contact information to be updated according to the acquisition request, and updates the user address book.

The NAB synchronizes or transmits updated information of the user address book to a UE.

In an embodiment, the present invention provides a system for processing an address book, which includes a UE, an NAB, and a service engine server.

The UE is adapted to access and manage the NAB.

The NAB is adapted to store and manage a user address book, and acquire and combine contact information to be updated.

The service engine server is adapted to provide relevant contact information to the NAB.

Compared with the conventional technology, the present invention has the following advantages:

By using the method of the present invention, an NAB is provided at the network side, so that plenty of contact information can be acquired according to user settings. Therefore, the method solves the problems that the address books in the conventional technology have single-purpose functions and closely related to services and thus cannot serve as an independent function for providing services for the user. In addition, address book information on a plurality of UEs of the user can be updated synchronously, so that when one UE initiates address book information update, the address books on other UEs are updated accordingly. Therefore, the consistency between the address book information on the UEs is guaranteed.

DETAILED DESCRIPTION OF THE EMBODIMENTS

The specific implementation of the present invention is further described in detail below with reference to the accompanying drawings and embodiments.

Figure 1:
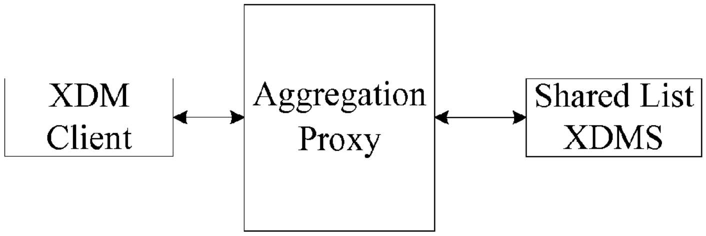
FIG. 1 shows the implementation architecture of an address book in the conventional technology.
Figure 2:
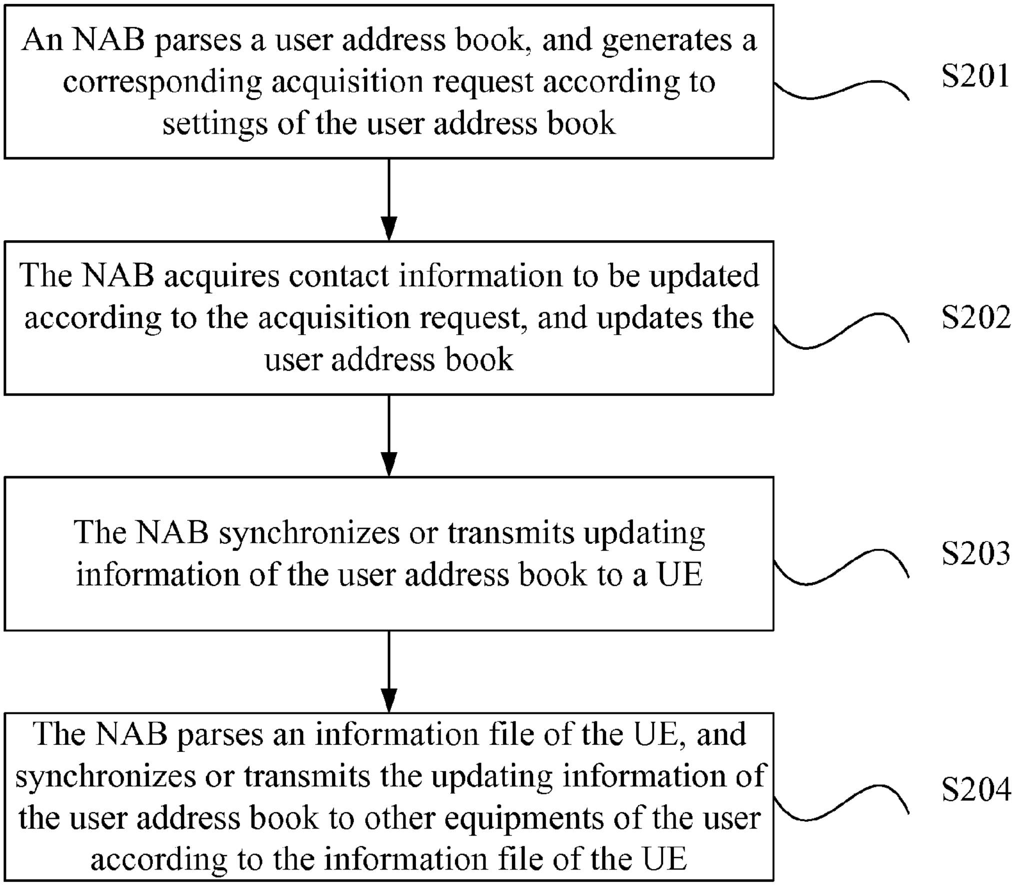
FIG. 2 is a flow chart of a method for processing an address book according to a first embodiment of the present invention.

FIG. 2 is a flow chart of a method for processing an address book according to a first embodiment of the present invention. Referring to FIG. 2, the method includes the following steps.

In step S201, an NAB parses a user address book, and generates an acquisition request according to settings of the user address book.

Specifically, before the NAB parses the user address book, the method further includes: receiving and storing, by the NAB, the user address book; and acquiring and parsing, by the NAB, the stored user address book when the NAB receives a user address book update request; or parsing, by the NAB, the received user address book.

In step S202, the NAB acquires contact information to be updated according to the acquisition request, and updates the user address book.

In step S203, the NAB synchronizes or transmits updated information of the user address book to a UE.

In step S204, the NAB parses an information file of the UE, and synchronizes or transmits the updated information of the user address book to other equipment of the user according to the information file of the UE.

Figure 3:
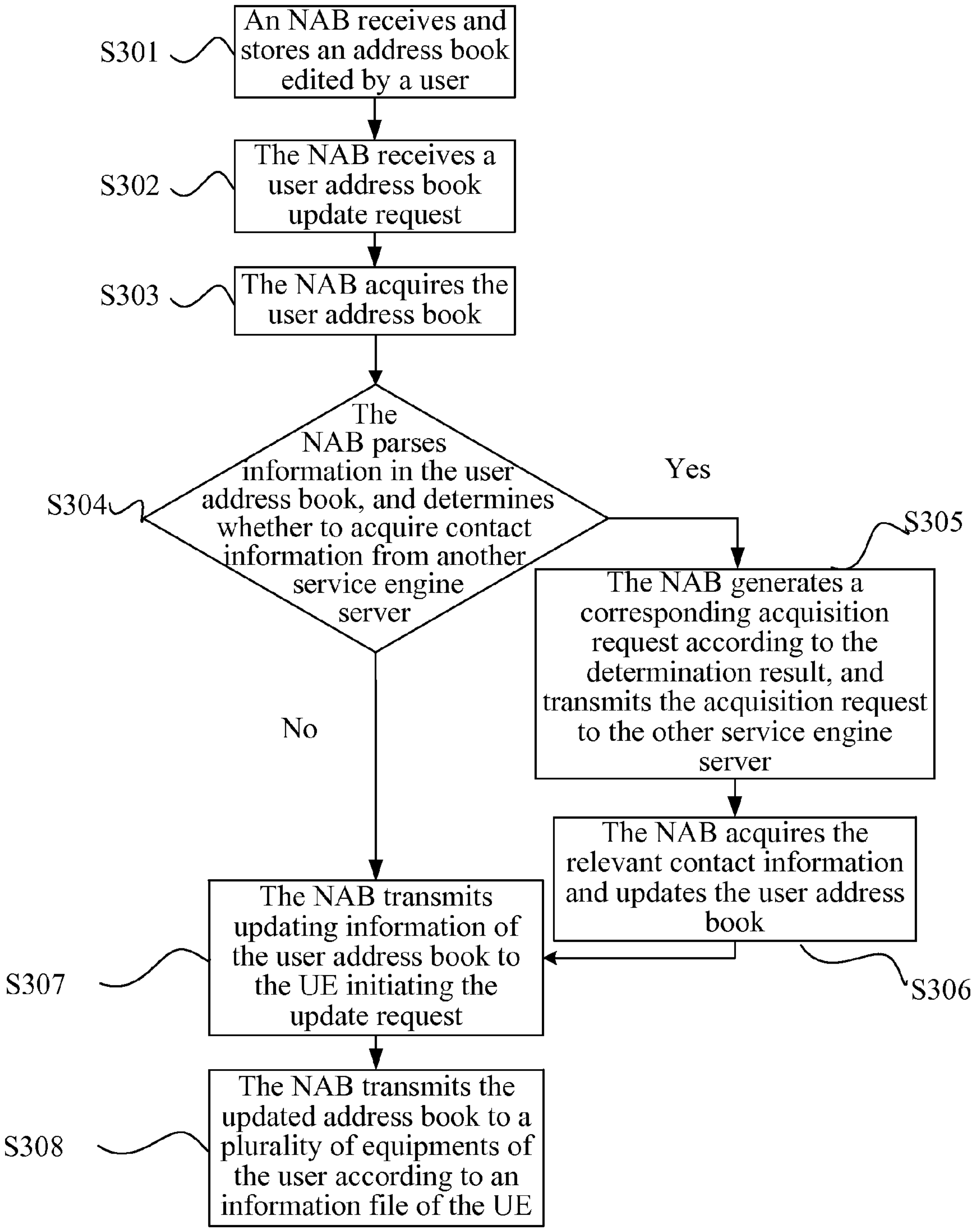
FIG. 3 is a flow chart of a method for processing an address book according to a second embodiment of the present invention.

FIG. 3 is a flow chart of a method for processing an address book according to a second embodiment of the present invention. Referring to FIG. 3, the method includes the following steps.

In step S301, an NAB receives and stores an address book edited by a user through an NAB Client.

Figure 4:
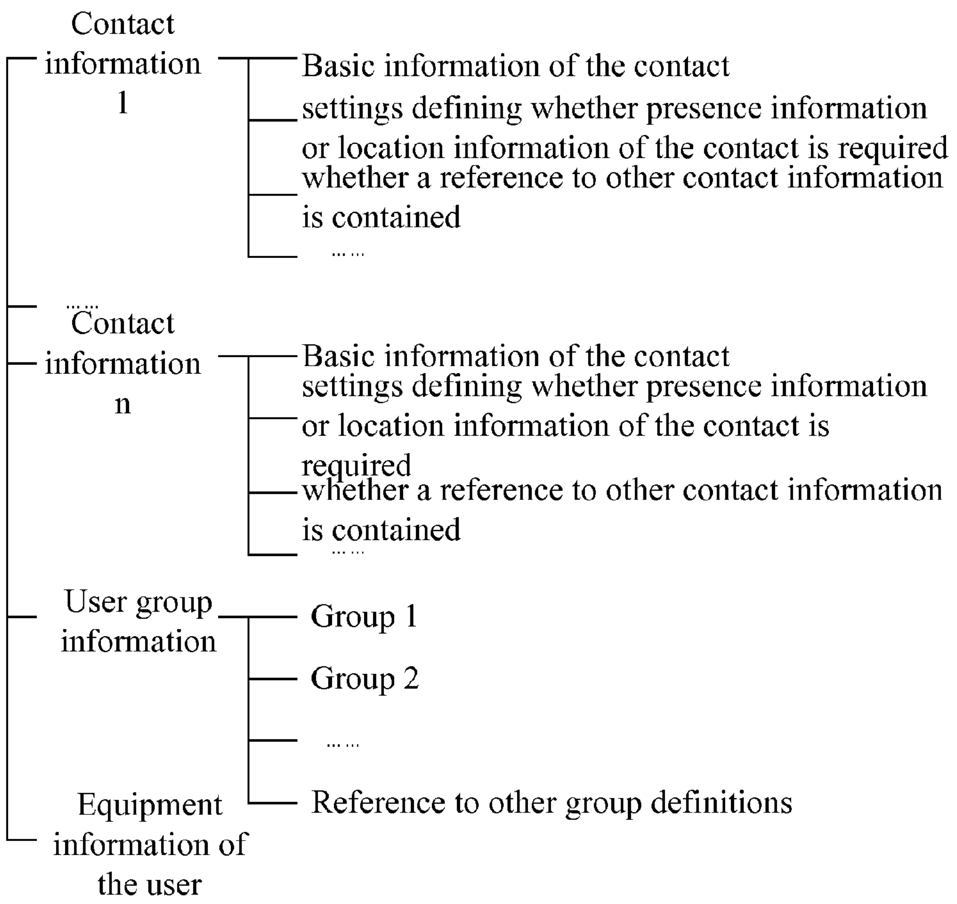
FIG. 4 is a schematic view of a basic structure of an address book according to the second embodiment of the present invention.

Specifically, the address book is a contact list containing such information as follows: information of one or more contacts, group information of the user, and equipment information of the user. The information of a contact further includes basic information and setting information about the contact. The basic information about the contact includes phone number, birth date, name, communication address, gender, and hobbies. The setting information includes relevant settings specifying whether the user address book needs to include presence information or location information of the contact and whether the user address book contains a reference to other contact information. The group information of the user includes whether to refer to other groups or lists defined by the user. The equipment information of the user includes registration information of the UE. A basic structure of the user address book is as shown in FIG. 4.

In step S302, the NAB receives a user address book update request.

The user address book update request received by the NAB is a request for updating the entire user address book or a request for updating information of a certain contact.

In step S303, the NAB acquires the user address book.

After receiving the address book edited by the user, the NAB stores the user address book in a data storage device of the NAB, so that after receiving the user address book update request, the NAB acquires the user address book from the data storage device according to user information contained in the update request.

In step S304, the NAB parses the acquired user address book, and determines whether relevant information about contacts needs to be acquired from another service engine server according to settings of the user address book. If the information needs to be acquired, step S305 is performed; if the information does not need to be acquired, step S307 is performed.

Specifically, the NAB parses the user address book after acquiring the user address book, and sequentially determines whether information of each contact needs to include the presence information or location information of the contact, whether the basic information of the contact contains a reference to the basic information of the contact, and whether the group information of the contact contains a reference to a certain group. If it is determined that any of the preceding information is required, the NAB generates an acquisition request according to a determination result. If it is determined that more than one piece of the preceding information is required, the NAB acquires the information by combining the contacts into lists according to home domain information of the contacts. For example, if it is determined that presence information of five contacts in the address book needs to be acquired, the NAB acquires the presence information by combining the five contacts into different lists according to home domain information of the contacts. The generated acquisition request message may vary according to mechanisms supported by corresponding service engines that receive the acquisition request message. For example, a presence information service engine supports SIP SUBSCRIBE and NOTIFY mechanisms, an XDMS supports an XCAP GET method and the SIP SUBSCRIBE and NOTIFY mechanisms, and the NAB uses the SIP SUBSCRIBE method when generating a request message for acquiring presence information of a contact, and may use either the SIP SUBSCRIBE method or the XCAP GET method for acquiring the contact information from the XDMS. Moreover, different filter conditions may be set for different service engines. For example, for presence information, the filter conditions may be set according to draft-ietf-simple-filter-format-05 of the Internet Engineering Task Force (IETF), and specifically, may be set according to a policy of a service provider (SP) or a policy of an operator or according to the settings of the user.

In step S305, the NAB generates an acquisition request according to the determination result, and sends the acquisition request to the other service engine server.

In step S306, after acquiring relevant contact information from the other service engine server, the NAB combines the acquired information with other contact information in the user address book, so as to update the user address book.

Specifically, after acquiring relevant contact information from the other service engine server, the NAB determines a type of the received information according to contents contained in the information or connections related to the information, for example, may determine that the received information is presence information according to an event header field in an SIP NOTIFY message, or determine that the received information is location information or feature information of the contact according to a HyperText Transfer Protocol (HTTP) connection that an HTTP response belongs to. Then, the NAB combines the acquired information with the contact information in the address book according to a contact ID, and adds the acquired information to a corresponding position of address book during the combination operation. For example, if it is set in the user address book that presence information of a contact needs to be acquired, the NAB adds the presence information to the setting as sub-information of the setting after acquiring the corresponding presence information. Moreover, the NAB also needs to add relevant parsing information to the address book, so as to enable the NAB Client to correctly display the information. For example, when the acquired information is implemented in the form of XML, the NAB should add a relevant name space to the address book during the combination, so as to display the information in the form of XML.

In step S307, the NAB transmits updated information of the user address book to the UE initiating the update request.

In step S308, the NAB transmits the updated address book to multiple pieces of equipment of the user according to an information file of the UE. The information file of the UE may be sent to the NAB through a registration request or notify message when the user registers with the NAB.

Specifically, the updated address book may be the updated portion of the address book, that is, may include only the changed portion of the contact information, or the whole address book. When the user receives the updated address book and updates the address book on the equipment, if the user address book is implemented in the form of XML, the user may distinguish the address book to be updated from the updated information of the address book by using an Etag.

Figure 5:
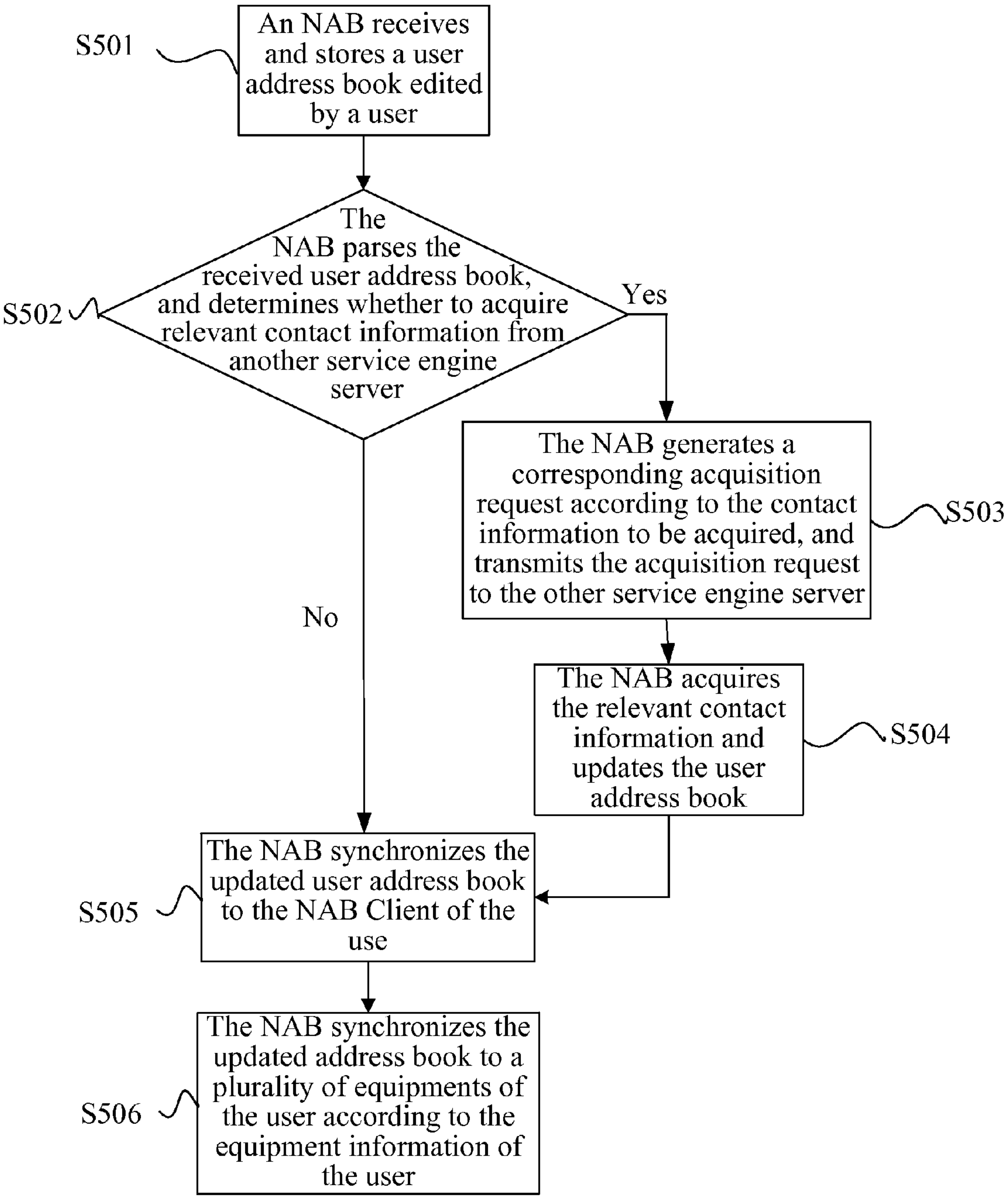
FIG. 5 is a flow chart of a method for processing an address book according to a third embodiment of the present invention.

FIG. 5 is a flow chart of a method for processing an address book according to a third embodiment of the present invention. Referring to FIG. 5, the method includes the following steps.

In step S501, an NAB receives and stores a user address book edited by a user through an NAB Client.

In step S502, the NAB parses the received user address book, and determines whether relevant information about contacts needs to be acquired from another service engine server according to settings of the user address book. If the information needs to be acquired, step S503 is performed; if the information does not need to be acquired, step S505 is performed.

In step S503, the NAB generates an acquisition request according to the relevant contact information to be acquired, and sends the acquisition request to the other service engine server.

In step S504, the NAB receives the contact information acquired from the other service engine server, and combines the acquired contact information with contact information in the user address book, so as to update the user address book.

In step S505, the NAB synchronizes the updated user address book to the NAB Client of the user.

Specifically, when the NAB synchronizes the address book to the NAB Client of the user, a synchronization mode such as timing synchronization, event-triggered synchronization, or synchronization each time the contact information in the address book is changed may be used. The synchronization setting may be described in the form of XML. For timing synchronization, a time interval may be determined according to a policy specified by the user, SP or operator. The time interval may be represented in the form of XML as follows:

```
<synchronization type=timing>
  <time_intervals value=10>
  <device_subset scope=subset>
    <device>
      <gruu>sip:alice@example.com;opaque="kjh29x97us97d"</gruu>
    </device>
  </device_subset>
</synchronization>
```

The "<synchronization>" element represents that the setting file is a synchronization setting file, and the value of a "type" attribute of the "<synchronization>" element is of an enumerated type. Specifically: "timing" represents timing synchronization, "event" represents event-triggered synchronization, and "change" represents synchronization each time in the contact information in the address book is changed. When the value of the "type" attribute is "timing", the <synchronization> element contains a <time_intervals> sub-element, and the <time_intervals> sub-element has a "value" attribute, which is an integral value, and represents a time interval for synchronization. The <synchronization> element further contains a <device_subset> sub-element, representing a subset of equipment to be synchronized. The <device_subset> sub-element may contain a "scope" attribute, with the value of "all" representing that the address book needs to be synchronized to all the equipment, and the value of "subset" representing that the address book is only synchronized to a part of the equipment. At this time, the <device_subset> element contains one or more <device> sub-elements, and the <device> sub-element further contains a <gruu> sub-element for representing an ID of the equipment to be synchronized.

Event-triggered synchronization means that when a predefined event occurs, the NAB initiates synchronization with the NAB Client. The predefined event may be a registration event of the user, an event that the user initiates an acquisition request, or a synchronization triggering condition predefined by the user. For example, the user may define the following synchronization conditions: when a contact 1 registers with a mobile communication network, the NAB synchronizes the information change to all the equipment of the user, or when the NAB receives an acquisition request of the user, the NAB synchronizes the information change to all the equipment of the user. The rule is represented in the form of XML as follows:

```
<synchronization type=event event=registration>
  <device__subset scope=subset>
    <device>
      <gruu>sip:alice@example.com;opaque="kjh29×97us97d"</gruu>
    </device>
  </device__subset>
</synchronization>
```

In the preceding form, when the value of the "type" attribute of the <synchronization> element is "event", it represents an event-triggered synchronization setting, and at this time, the <synchronization> element adds an "event" attribute for representing the type of event synchronization. The "event" attribute may have a value of "registration" representing synchronization triggered by a registration event, "fetch" representing synchronization triggered by an acquisition request initiated by the user, or the like.

In step S506, the NAB synchronizes the updated address book to multiple pieces of equipment of the user according to the information file of the UE.

The main difference between the third embodiment and the second embodiment of the present invention lies in that, after receiving and storing the user address book, the NAB immediately parses the address book, and acquires the contact information according to settings of the user address book. However, in the first embodiment, the NAB acquires the contact information according to settings of the user address book after receiving the update request of the user.

Figure 6:
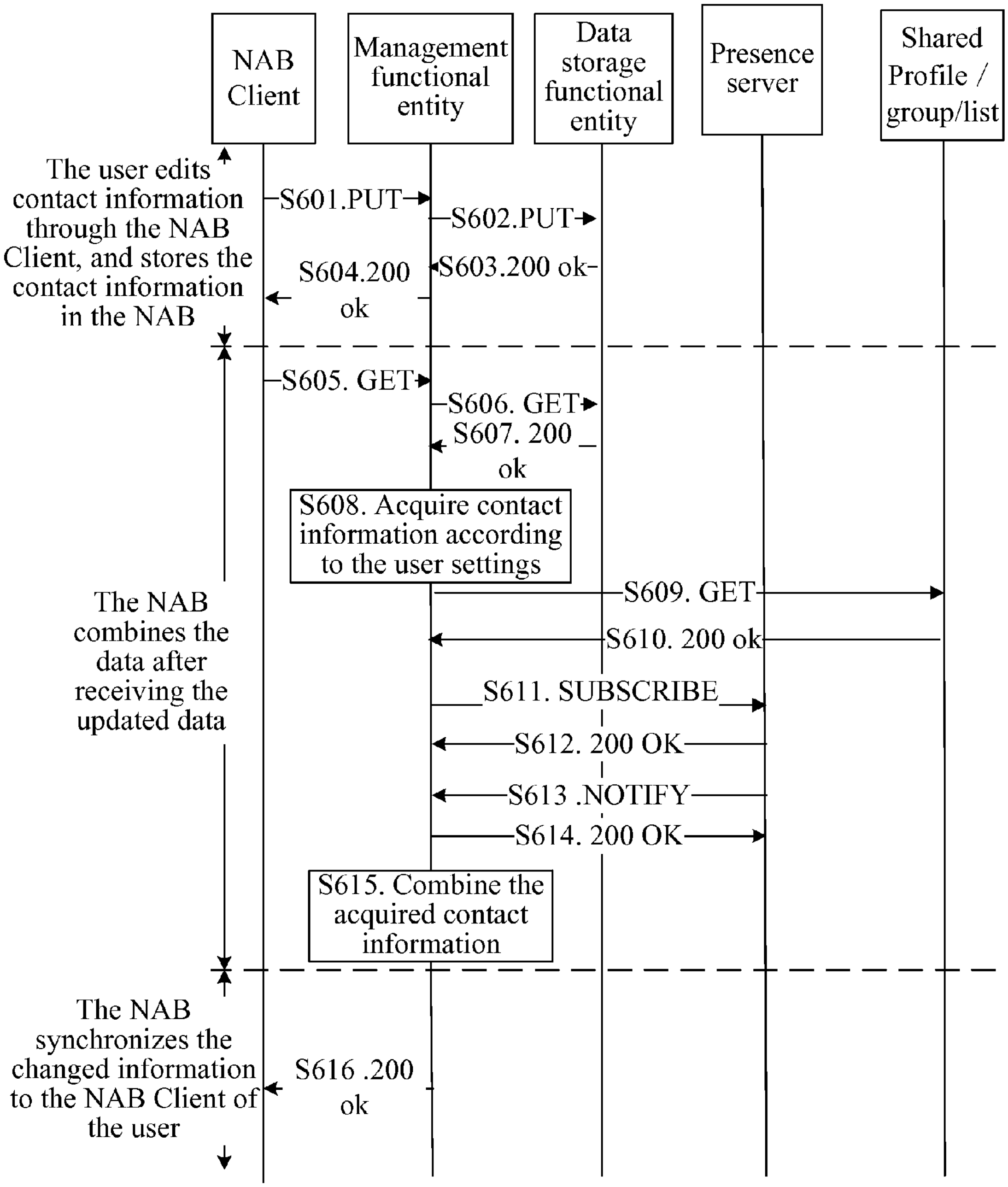
FIG. 6 is a flow chart of a method for processing an address book according to a fourth embodiment of the present invention.

In a fourth embodiment of the present invention, the user adds contact information through the NAB Client, and stores the added contact information in the NAB, so that when the user uses the address book, the NAB Client initiates an information update request to the NAB, and acquires the latest contact information of a contact in the NAB, for example, the presence information, shared group/list/contact profile of the contact. FIG. 6 is a flow chart of a method for processing an address book according to the fourth embodiment of the present invention. Referring to FIG. 6, the method includes the following steps.

In step S601, a user having a public user ID of sip:joebloggs@example.com adds information of a contact having an ID of sip:friend1@example.com to a user address book 1 (addressbook1) through an NAB Client on a UE, and stores the newly added contact information in an NAB through an XCAP PUT method. An addition message of the XCAP PUT method is shown as follows:

```
PUT
http://xcap.example.com/nbook/users/sip:joebloggs@example.com/
addressbook1/~~/resource-lists/list[@name="My__friends"]/
entry[@uri="sip:friend2@example.com"] HTTP/1.1
...
```

-continued

```
Content-Type: application/xcap-el+xml
Content-Length: (...)
<?xml version="1.0" encoding="UTF-8"?>
  <entry uri="sip:friend2@example.com">
    <display-name>Friend2</display-name>
  </entry>
```

Further, the user may also add a reference to other contact lists or group lists into the address book, and the reference information may be represented by a "ref" attribute of an <entry-ref> element or an "anchor" attribute of an <external> element. When the referring contact list and the referred contact list are under the same XCAP root, the value of the "ref" attribute of the <entry-ref> element is a relative path value of the referred contact list. When the referring contact list and the referred contact list are under different XCAP roots, the value of the "anchor" attribute of the <external> element is an absolute path value of the referred contact list.

The user may also add basic information of a contact to the address book, or refer to basic information of the contact defined in other engine servers in the address book, for example, user basic information defined in the Shared Profile of the Open Mobile Alliance Presence and Availability Working Group (OMA PAG) can be referred to through an anchor attribute of a <basic-info> element. If no relevant basic information of the contact is defined on other service engine servers, the user may add basic information of the contact through the NAB Client. The basic information of the contact may include phone number, birth date, name, communication address, gender, and hobbies of the contact. The phone number may be represented by a <communication-address> element, which may have a value of an SIP URI (Uniform Resource Identifier), TEL URI, E.164 address, email address or the like of the user. The birth date may be represented by a <birth-date> element. The gender may be represented by a <gender> element. The hobbies may be represented by a <hobbies> element. The basic information of the contact may be further extended to include more information, but the details are not described herein.

Moreover, the user address book may also contain an ID element indicating whether to subscribe to presence information or location information of the contact, which may be represented by a "flag" attribute of a <presence-info> element or <location-info>, with a Boolean value of true or false. The user address book may also contain an ID element indicating whether roam information of the contact is required, which may be represented by a "flag" attribute of a <roam-info> element, with a Boolean value of true or false.

An example of the address book containing such information is shown as follows:

```
<entry uri="sip:friend3@example.com">
  <display-name>Friend3</display-name>
  <basic-info>
      <communication-address>
        <comm-addr>tel:13843859438</comm-addr>
      </communication-address>
      <birth-date>1980-11-20</birth-date>
      <gender>male</gender>
      <hobbies>basketball</hobbies>
  </basic-info>
  <presence-info flag="true"/>
  <roam-info    flag="true">
</entry>
<entry uri="sip:friend4@example.com">
  <display-name>Friend4</display-name>
```

-continued

```
<basic-info
    anchor="http://org.openmobilealliance.user-profile/users/
    sip:friend4@example.com/user-profile/">
  <presence-info flag="true"/>
  <roam-info flag="false">
</entry>
<entry-ref ref="nbook/users/sip:joebloggs@example.com/addressbook2/
~~/resource-lists/list%5b@name=%22list1%22%5d/
entry%5b@uri=%22sip:petri@example.com%22%5d"/>
```

In step S602, the NAB transmits the received newly added contact information to a data storage functional entity, and the data storage functional entity updates the newly added contact information into the addressbook1. The updated addressbook1 is shown as follows:

```
<?xml version="1.0" encoding="UTF-8"?>
    <resource-lists xmlns="urn:ietf:params:xml:ns:resource-lists"
       xmlns:xsi="http://www.w3.org/2001/XMLSchema-instance">
<list name="My__friends">
<entry uri="sip:friend1@example.com">
    <display-name>Friend1</display-name>
  </entry>
<entry uri="sip:friend2@example.com">
    <display-name>Friend2</display-name>
  </entry>
<entry uri="sip:friend3@example.com">
    <display-name>Friend3</display-name>
    <basic-info>
        <communication-address>
          <comm-addr>tel:13843859438</comm-addr>
        </communication-address>
        <birth-date>1980-11-20</birth-date>
        <gender>male</gender>
        <hobbies>basketball</hobbies>
    </basic-info>
    <presence-info flag="true"/>
    <roam-info    flag="false">
</entry>
<entry uri="sip:friend4@example.com">
    <display-name>Friend4</display-name>
    <basic-info
      anchor="http://org.openmobilealliance.user-profile/users/
      sip:friend4@example.com/user-profile/">
    <presence-info flag="true"/>
    <roam-info    flag="false">
</entry>
<entry-ref ref="nbook/users/sip:joebloggs@example.com/addressbook2/
~~/resource-lists/list%5b@name=%22list1%22%5d/
entry%5b@uri=%22sip:petri@example.com%22%5d"/>
```

In step S603, after updating the addressbook1, the data storage functional entity returns a 200 ok success response to the NAB.

In step S604, the NAB returns a 200 ok success response to the NAB Client of the user.

In step S605, the user uses the user address book through the NAB Client, and the NAB Client initiates an information update request to the NAB through the XCAP GET method.

In step S606, after receiving the information update request, a management functional entity of the NAB acquires the user address book addressbook1 from the data storage functional entity through the XCAP GET method. The acquisition request is shown as follows:

```
GET
/org.openmobilealliance.network-addressbook/users/
sip:joebloggs@example.com/addressbook1 HTTP/1.1
Host: xcap.example.com
```

-continued

```
User-Agent: NAB-client/OMA2.0
Date: Aug, 10 Aug 2007 10:50:33 GMT
X-3GPP-Intended-Identity: "sip:joebloggs@example.com"
```

Further, the update request may be adapted to only update contact information of a certain contact, or adapted to update the entire address book. For example, when only information of a contact having the ID of sip:friend2@example.com is updated, the acquisition request is shown as follows:

```
GET
/org.openmobilealliance.network-addressbook/users/
sip:joebloggs@example.com/addressbook1/~~/
resource-lists/entry[@uri="sip:friend2@example.com"] HTTP/1.1
```

In step S607, the data storage functional entity returns a 200 ok success response to the management functional entity of the NAB, and returns the acquired user address book addressbook1 through the response. The form and contents of the addressbook1 are as shown in the table of step S602.

In step S608, the management functional entity of the NAB parses the acquired addressbook1, determines that presence information of a contact having the contact ID of sip:friend3@example.com needs to be acquired according to contents recorded in the addressbook1, and acquires presence information and basic information of a contact having the contact ID of sip:friend4@example.com.

In step S609, according to the determination result in step S608, the management functional entity of the NAB acquires the basic information of the contact having the ID of sip:friend4@example.com from a Shared Profile XDMS through the XCAP GET method. The acquisition request is shown as follows:

```
GET /org.openmobilealliance.user-profile/users/
sip:friend4@example.com/user-profileHTTP/1.1
Host: xcap.example.com
User-Agent: XDM-client/OMA2.0
Date: Aug, 10 Aug 2007 10:50:33 GMT
X-3GPP-Intended-Identity: "sip: joebloggs@example.com"
```

In step S610, the Shared Profile XDMS returns a 200 ok success response to the NAB, and returns the basic information of the contact having the ID of sip:friend4@example.com through the response. Contents of the returned response message are shown as follows:

```
HTTP/1.1 200 OK
Etag: "et53"
...
Content-Type: application/vnd.oma.user-profile+xml
<?xml version="1.0" encoding="UTF-8"?>
<user-profiles xmlns="urn:oma:xml:xdm:user-profile">
<user-profile uri="sip:friend4@example.com">
  <communication-addresses>
    <comm-addr>+1 858 623 0743</comm-addr>
  </communication-addresses>
  <display-name xml:lang="en">Alice</display-name>
  <birth-date>1995-05-20</birth-date>
  <gender>female</gender>
</user-profile>
</user-profiles>
```

In step S611, according to the determination result in step S608, the management functional entity of the NAB subscribes to presence information of contacts having IDs of sip:friend3@example.com and sip:friend4@example.com from a presence server through the SIP SUBSCRIBE method.

Further, the SUBSCRIBE request may be a one-time SUBSCRIBE request or long-term SUBSCRIBE request. If the SUBSCRIBE request is a one-time SUBSCRIBE request, the value of an Expires header field of the SUBSCRIBE request needs to be specified as "0".

Further, when presence information of a plurality of contacts needs to be acquired according to the determination result in step S608, the management functional entity of the NAB may combine the contacts into a list, and sends the list to a resource list server (RLS) as a message body of a SUBSCRIBE request. The RLS generates a back-end SUBSCRIBE request according to the list, sends the request to the presence server, so as to subscribe to the presence information of all the contacts in the list. A subscription list formed by the two contacts is shown as follows:

```
<?xml version="1.0" encoding="UTF-8"?>
<resource-lists xmlns="urn:ietf:params:xml:ns:resource-lists"
          xmlns:xsi="http://www.w3.org/2001/XMLSchema-instance">
  <list>
    <entry uri="sip:friend3@example.com" />
    <entry uri="sip:friend4@example.org" />
  </list>
</resource-lists>
```

In step S612, after the subscription is completed successfully, the presence server or the RLS returns a 200 ok success response to the NAB.

In step S613, the presence server sends a NOTIFY message for the subscribed presence information of the contacts to the NAB through the SIP NOTIFY method. The presence information of the two contacts is shown as follows:

```
<?xml version="1.0" encoding="UTF-8"?>
  <presence xmlns="urn:ietf:params:xml:ns:pidf"
        xmlns:im="urn:ietf:params:xml:ns:pidf:im"
        xmlns:myex="http://id.example.com/presence/"
        entity="sip:friend3@example.com">
    <tuple id="bs35r9">
      <status>
        <basic>open</basic>
        <im:im>busy</im:im>
          <myex:location>home</myex:location>
      </status>
      <note xml:lang="en">Don't Disturb Please!</note>
      <timestamp>2001-10-27116:49:29Z</timestamp>
    </tuple>
</presence>
<?xml version="1.0" encoding="UTF-8"?>
  <presence xmlns="urn:ietf:params:xml:ns:pidf"
          xmlns:im="urn:ietf:params:xml:ns:pidf:im"
          xmlns:myex="http://id.example.com/presence/"
          entity="sip:friend4@example.com">
<tuple id="eg92n8">
      <status>
          <basic>open</basic>
      </status>
    </tuple>
  <note>I'll be in Tokyo next week</note>
</presence>
```

In step S614, the NAB returns a 200 ok success response to the presence server.

In step S615, the NAB combines the acquired information with the contact information in the address book.

Further, when combining the acquired information with the contact information in the address book, the NAB may add the acquired information to the address book according to the user IDs of the contacts. When the information is added, a relevant name space should be added to the address book, and after the addition, the address book is shown as follows:

```
<?xml version="1.0" encoding="UTF-8"?>
  <resource-lists xmlns="urn:ietf:params:xml:ns:resource-lists"
xmlns:xsi=http://www.w3.org/2001/XMLSchema-instance
xmlns="urn:ietf:params:xml:ns:pidf"
xmlns:im="urn:ietf:params:xml:ns:pidf:im"
      xmlns:myex=http://id.example.com/presence
xmlns="urn:oma:xml:xdm:user-profile"/>
<list name="My__friends">
<entry uri="sip:friend1@example.com">
    <display-name>Friend1</display-name>
</entry>
<entry uri="sip:friend2@example.com">
    <display-name>Friend2</display-name>
</entry>
<entry uri="sip:friend3@example.com">
    <display-name>Friend3</display-name>
    <basic-info>
        <communication-address>
<comm-addr>tel:13843859438</comm-addr>
</communication-address>
      <birth-date>1980-11-20</birth-date>
      <gender>male</gender>
      <hobbies>basketball</hobbies>
  </basic-info>
  <presence-info flag="true">
    <tuple id="bs35r9">
      <status>
        <basic>open</basic>
        <im:im>busy</im:im>
        <myex:location>home</myex:location>
      </status>
      <note xml:lang="en">Don't Disturb Please!</note>
      <timestamp>2001-10-27T16:49:29Z</timestamp>
    </tuple>
</presence-info>
  <roam-info   flag="false">
</entry>
<entry uri="sip:friend4@example.com">
  <display-name>Friend4</display-name>
<basic-info>
      <communication-addresses>
          <comm-addr>+1 858 623 0743</comm-addr>
      </communication-addresses>
      <display-name xml:lang="en">Alice</display-name>
      <birth-date>1995-05-20</birth-date>
<gender>female</gender>
</basic-info>
  <presence-info>
<tuple id="eg92n8">
        <status>
          <basic>open</basic>
        </status>
      </tuple>
    <note>I'll be in Tokyo next week</note>
  </presence-info>
  <roam-info   flag="false">
</entry>
<entry-ref ref="nbook/users/sip:joebloggs@example.com/addressbook2/
  ~~/resource-lists/list%5b@name=%22list1%22%5d/
entry%5b@uri=%22sip:petri@example.com%22%5d"/>
```

In step S616, the NAB returns a 200 ok success response to the NAB Client of the user, and transmits the contact information combined in the step S615 to the NAB Client of the user as a message body.

Further, the user address book may further contain relevant settings of the location information of the contact, and a <location> element may be used to represent the location information of the contact, in which the value of a "flag" attribute of the <location> element is used to represent whether the user needs the location information of the contact, the “flag” attribute is a Boolean value of true or false. When the value of the “flag” attribute of the <location> element of a certain contact is true, the NAB may generate a request message for acquiring the location information of the contact through the Mobile Location Protocol (MLP). The request message may be an immediate location request message or triggered location request message. When the request message is the immediate location request message, the value of an <id> sub-element of a <requestor> element in the message header may be set to a Mobile Station ISDN Number (MSISDN) ID, IP ID, or SIP URI of the NAB, the value of a <serviceid> sub-element is set to a service ID of the NAB (the ID is assigned by the operator), the value of an <msid> sub-element in the message body is set to the SIP URI of the contact, and meanwhile, the type attribute of the element is set to “SIP URI”. The NAB may further contain a plurality of contact IDs in a message body of a location information request to acquire location information of a plurality of contacts at a time.

Further, after the NAB returns the updated address book information to the UE initiating the update request, the NAB parses the information file of the UE, and transmits the updated information of the address book to other equipment of the user according to the information file of the UE. The information file of the UE may be stored in a data storage device of the NAB, so that when the UE registers with an IP Multimedia Subsystem (IMS) network, the NAB acquires equipment information of the user through third-party registration, and adds the equipment information to the information file of the UE. The equipment information of the user may be a GRUU (Globally Routable User Agent URI) or contact address of the UE.

In the above embodiment, the NAB Client is a functional entity on the UE, the management functional entity is a functional entity on the NAB, the data storage functional entity is located on the NAB or is an independent network entity, the presence server and the Shared Profile XDMS belong to the same service engine server or different service engine servers.

Figure 7:
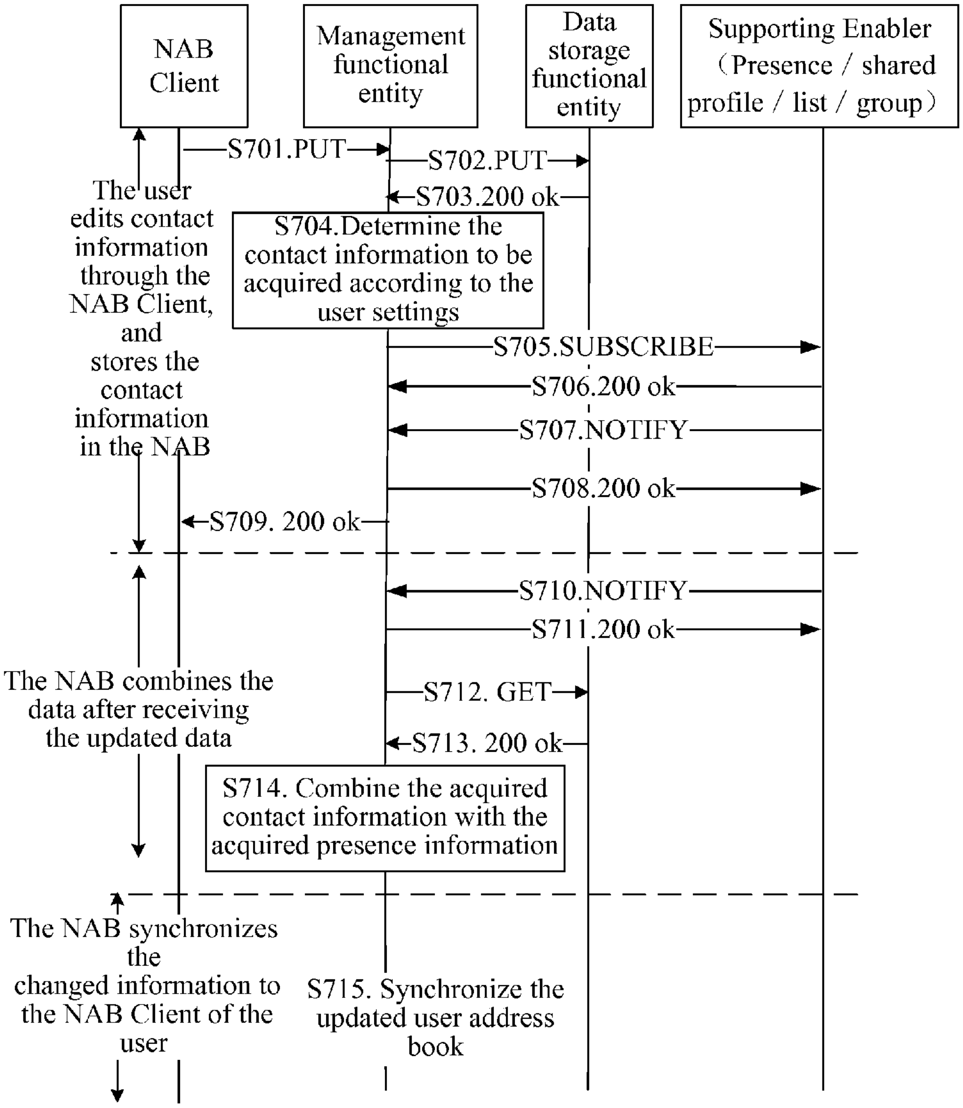
FIG. 7 is a flow chart of a method for processing an address book according to a fifth embodiment of the present invention.

In a fifth embodiment of the present invention, the user adds contact information to the user address book through the NAB Client, and stores the added information in the NAB. After receiving a storage request of the user, the NAB parses contents in the user address book, acquires various contact information according to settings in the user address book, and returns the latest contact information to the NAB Client of the user. When the contact information changes, the NAB updates the user address book in real time, and synchronizes the address book information in the updated NAB and the address book on the UE in real time; alternatively, when the user initiates an update request through the NAB Client of the UE, the NAB synchronizes the address book information in the NAB and the address book information on the UE. FIG. 7 is a flow chart of a method for processing an address book according to the fifth embodiment of the present invention. Referring to FIG. 7, the method includes the following steps.

In step S701, a user having a public user ID of sip:joebloggs@example.com adds information of a contact having the ID of sip:friend2@example.com to a user address book 1 (addressbook1) through an NAB Client on a UE, sets that presence information of the contact is required, refers to the basic information of the contact, and stores the newly added contact information in an NAB through an XCAP PUT method. An addition message of the XCAP PUT method is shown as follows:

```
PUT
http://xcap.example.com/nbook/users/sip:joebloggs@example.com/
addressbook1/~~/resource-
lists/list[@name="My_friends"]/
entry[@uri="sip:friend2@example.com"] HTTP/1.1
...
Content-Type: application/xcap-el+xml
Content-Length: (...)
<?xml version="1.0" encoding="UTF-8"?>
  <entry uri="sip:friend2@example.com">
    <display-name>Friend2</display-name>
    <basic-info
anchor="http://org.openmobilealliance.user-profile/users/
sip:friend2@example.com/user-profile/">
    <presence-info flag="true"/>
  </entry>
```

In step S702, the NAB stores the addressbook1 submitted by the user in a data storage functional entity through the XCAP PUT method.

In step S703, after the storage is completed successfully, the data storage functional entity returns a 200 ok success response to a management functional entity of the NAB.

In step S704, the management functional entity parses the addressbook1 submitted by the user, determines that basic contact information and presence information of the contact need to be acquired according to the anchor attribute of <basic-info> and the flag attribute of <presence-info>, and generates a corresponding acquisition request.

In step S705, the NAB sends a SUBSCRIBE request message for subscribing to a contact having the contact ID of sip:friend2@example.com to the presence server. The SUBSCRIBE request may contain a filter, and it may be specified that only service information currently used by the contact is subscribed to through the filter. The filter may be specified according to a policy of the SP or operator. The SUBSCRIBE request containing the filter is shown as follows:

```
SUBSCRIBE sip:friend2@example.com sip2.0
......
Event: presence
accept: application/simple-filter+xml
......
<?xml version="1.0" encoding="UTF-8"?>
  <filter-set xmlns="urn:ietf:params:xml:ns:simple-filter">
    <ns-bindings>
      <ns-binding prefix="pidf" urn="urn:ietf:params:xml:ns:pidf"/>
      <ns-binding prefix="rpid"
              urn="urn:ietf:params:xml:ns:pidf:rpid-tuple"/>
    </ns-bindings>
    <filter id="123" uri="sip:friend2@example.com">
      <what>
      <include type="xpath">
        /pidf:presence/pidf:tuple
      </include>
    </what>
  </filter>
</filter-set>
```

In step S706, after the subscription is completed successfully, the presence server returns a 200 ok success response to the NAB.

In step S707, the presence server sends a NOTIFY message for the presence information of the contact to the NAB through the SIP NOTIFY method, and the message body contains the presence information of the contact.

In step S708, the NAB returns a 200 ok success response to the presence server.

In step S709, the NAB combines the acquired information with the addressbook1 submitted by the user through the NAB Client in step S701, and sends the combined addressbook1 to the NAB Client as a message body of a 200 ok response.

In step S710, when the presence information of the contact having the ID of sip:friend2@example.com changes, the presence server sends a NOTIFY message for the change in the presence information to the NAB through the SIP NOTIFY method.

In step S711, the NAB returns a 200 ok success response to the presence server.

In step S712, the NAB acquires the addressbook1 of the user from the data storage functional entity through the XCAP GET method.

In step S713, the data storage functional entity returns a 200 ok success response to the NAB, and carries the addressbook1 in the message body.

In step S714, the NAB combines the contact information in the addressbook1 of the user with the acquired presence information, and the combination method is as shown in the combination process described in the fourth embodiment.

In step S715, the NAB synchronizes the addressbook1 to the NAB Client of the user through data synchronization technology.

In the above embodiment, the NAB Client is a functional entity on the UE, the management functional entity is a functional entity on the NAB, the data storage functional entity is located on the NAB or is an independent network entity, the presence server and the Shared Profile XDMS belong to the same service engine server or different service engine servers.

Through the method provided in the embodiments of the present invention, an NAB is provided at the network side, so that plenty of contact information can be acquired according to user settings, thereby solving the problems that the address books in the conventional technology are directed to single purpose functions, and have a strong correlation with the service and thus cannot serve as an independent function for providing services for the user. In addition, address book information on a plurality of UEs of the user can be updated synchronously, so that when one UE initiates address book information update, the address books on other UEs are updated accordingly, thereby ensuring the consistency between the address book information on the UEs.

Figure 8:
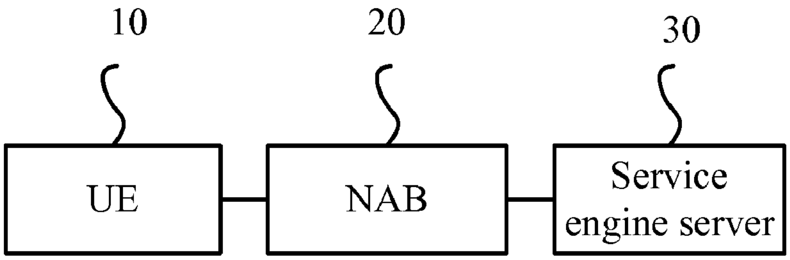
FIG. 8 is a block diagram of a system for processing an address book according to a sixth embodiment of the present invention.

FIG. 8 is a block diagram of a system for processing an address book according to a sixth embodiment of the present invention. Referring to FIG. 8, the system includes at least one UE 10, an NAB 20, and at least one service engine server 30.

The UE 10 is adapted to access and manage the NAB 20 through an NAB Client. The NAB Client may access and manage the NAB 20 through the XCAP, SIP, or Data Synchronization (DS) Protocol. Moreover, the NAB Client further provides access interfaces with other service clients, for example, interfaces between the NAB Client and service clients such as a PoC client and an IM client.

The NAB 20 is adapted to store and manage a user address book, and acquire and combine contact information to be updated. Correspondingly, the NAB 20 may be connected to the service engine server 30 through a certain interface. For example, when the service engine server 30 is a presence server, the NAB 20 may acquire presence information of a contact through a PRS-2 interface between an observer and an SIP/IP Core and a PRS-3 interface between the SIP/IP Core and the presence server defined in the Presence service engine specifications by the OMA PAG. The NAB 20 may further support an interface with a Shared XDMS, and realize the function of acquiring basic information of a contact through the XCAP or SIP. The NAB 20 may further support an interface with a location server, and acquire location information of a contact through the MLP.

The service engine server 30 is connected to the NAB 20 through a certain interface, and adapted to provide relevant contact information to the NAB 20. The service engine server 30 further includes a presence information server, a location information server, a shared list server, and a shared group server.

Figure 9:
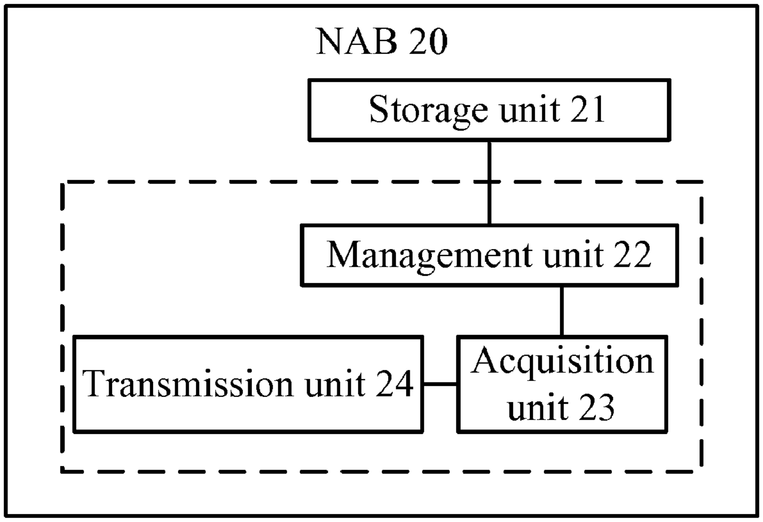
FIG. 9 is a block diagram of a device for processing an address book according to a seventh embodiment of the present invention.

FIG. 9 shows an NAB according to a seventh embodiment of the present invention, which includes a storage unit 21, a management unit 22, an acquisition unit 23, and a transmission unit 24.

The storage unit 21 is adapted to store the user address book and an information file of the UE. The user address book may be represented in the form of XML, so that the storage unit 21 may be implemented in the form of an XDMS or a database. The storage unit 21 is located on the NAB 20 or is an independent network device.

The management unit 22 is connected to the storage unit 21, and adapted to manage the user address book stored in the storage unit 21, including operations of creating, acquiring, copying, deleting, and modifying an address book. According to the implementation of the storage unit 21, the management unit 22 may be implemented through different protocols.

When the storage unit 21 is implemented in the form of an XDMS, the management functions may be implemented through the XCAP.

The acquisition unit 23 is adapted to determine settings of the user address book, generate an acquisition request according to the contact information to be updated in the user address book and send the acquisition request to the service engine server 30, acquire the contact information to be updated from the service engine server 30, and combine the acquired contact information to be updated with the contact information in the user address book, so as to update the user address book. To acquire the contact information from different service engine servers, the acquisition unit 23 needs to implement corresponding protocols. For example, when the contact information contains a reference to basic information of the contact, the acquisition unit 23 needs to support the XCAP; when the contact information contains settings defining that presence information of the contact is required, the acquisition unit 23 needs to support the SIP; when the contact information contains settings defining that location information of the contact is required, the acquisition unit 23 needs to support the MLP.

The transmission unit 24 is adapted to transmit the user address book updated by the acquisition unit 23 to the UE 10 through data synchronization or other methods such as SIP PUBLISH method and PUSH method.

Figure 10:
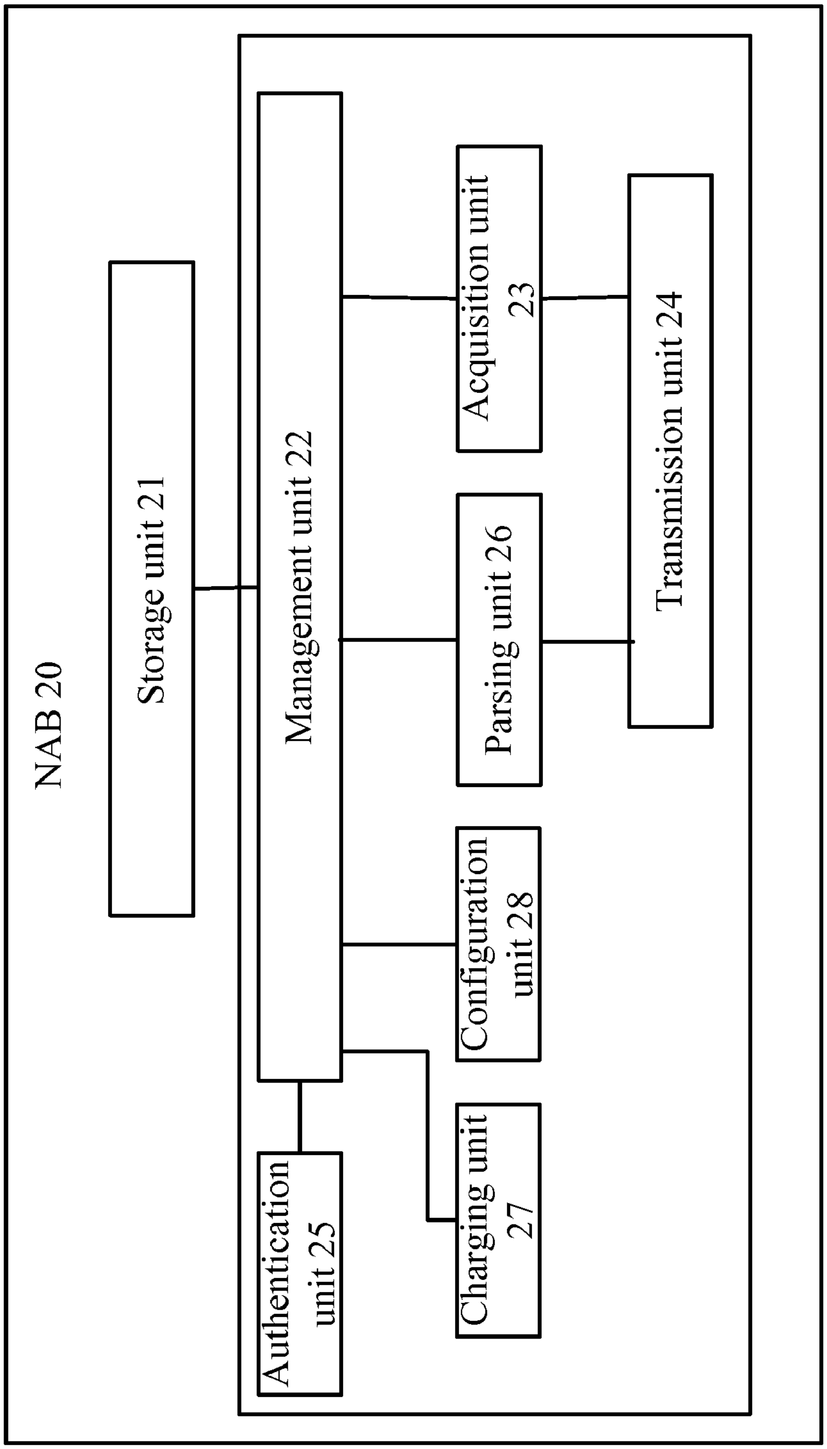
FIG. 10 is a block diagram of another device for processing an address book according to an eighth embodiment of the present invention.

FIG. 10 shows another NAB according to an eighth embodiment of the present invention. Referring to FIG. 10, the NAB further includes an authentication unit 25, a parsing unit 26, a charging unit 27, and a configuration unit 28, on the basis of the above address book.

The authentication unit 25 is connected to the UE 10, and adapted to authenticate an access request of the user. The authentication unit 25 supports authentication mechanisms such as HTTP Digest and Generic Authentication Architecture (GAA).

The parsing unit 26 is adapted to acquire the information file of the UE from the storage unit 21 through the management unit 22 after receiving a command from the transmission unit 24, parse the information file of the UE, and return a parsing result to the transmission unit 24, so that the transmission unit 24 synchronizes or transmits the user address book acquired from the acquisition unit 23 to all other equipment recorded in the information file of the UE according to the received parsing result.

The charging unit 27 is connected to the management unit 22, and adapted to generate charging information for an operation of managing the address book by the user, and report the charging information to a charging system. The charging information may be collected according to the management operations by the user, for example, an operation of adding a contact or creating an address book.

The configuration unit 28 is connected to the management unit 22, and adapted to provide simple management of the NAB for an SP or operator. For example, by the configuration unit 28, the SP or operator may set the number of address books that an ordinary NAB user is allowed to create, and the number of contacts in each address book. The configuration unit 28 may implement the configuration file in the form of XML, and stores the configuration file in the storage unit 21.

Through the system and device provided in the embodiments, an NAB is provided at the network side, so that plenty of contact information can be acquired according to user settings, thereby solving the problems that the address books in the conventional technology are directed to single purpose functions, and have a strong correlation with the service and thus cannot serve as an independent function for providing services for the user. In addition, address book information on a plurality of UEs of the user can be updated synchronously, so that when one UE initiates address book information update, the address books on other UEs are updated accordingly, thereby ensuring the consistency between the address book information on the UEs.

Through the above description of the embodiments, it is apparent to persons skilled in the art that the present invention may be accomplished by software on a necessary universal hardware platform, and definitely may also be accomplished by hardware, but in most cases, the present invention is preferably implemented through the former method. Therefore, the technical solution of the present invention or the part that makes contributions to the conventional technology can be substantially embodied in the form of a software product. The computer software product is stored in a storage medium, and contains several instructions adapted to instruct terminal equipment to perform the method as described in the embodiments of the present invention.

The above descriptions are merely specific embodiments of the present invention, but not intended to limit the present invention. Any variation that can be easily thought of by persons skilled in the art should fall in the scope of the present invention.

Through the above description of the implementation, it is clear to persons skilled in the art that the present invention may be accomplished through hardware, or through software plus a necessary universal hardware platform. Based on this, the technical solutions of the present invention may be embodied in the form of a software product. The software product may be stored in one or more nonvolatile storage media (for example, CD-ROM, USB flash drive, or removable hard disk) and contain several instructions adapted to instruct computer equipment (for example, a personal computer, a server, or network equipment) to perform the method according to the embodiments of the present invention.

Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

We claim:

1. In a network address book (NAB) server capable of providing multi-functional, autonomous services and configured to communicate with one or more user equipment (UE) that includes a single user address book client with multi-service functionality, a method of processing and updating a user address book with service information for one or more contacts, the method comprising:

receiving an update request for updating at least a portion of a user address book that includes a contact list with contact information for one or more contacts;

based on the received update request, parsing the user address book for determining if updated contact information is needed from a different service engine server;

based on one or more settings in the user address book, determining that updated contact information is needed for the one or more contacts from a different service engine server and generating an acquisition request according to settings of the user address book and the needed updated contact information;

acquiring from the different service engine server contact information to be updated according to the acquisition request;

based on the received contact information, updating the user address book;

synchronizing a user address book client by transmitting at least updated information of the user address book to a user equipment (UE); and parsing an information file of the UE, and synchronizing by transmitting the updated information of the user address book to other equipment of the user according to the information file of the UE.

2. The method for processing an address book according to claim 1, wherein before the parsing the user address book, the method further comprises:

receiving and storing, the user address book; and acquiring and parsing the stored user address book upon receiving a user address book update request.

3. The method for processing an address book according to claim 1, wherein before the parsing the user address book, the method further comprises:

receiving and storing the user address book; and parsing the received user address book.

4. The method for processing an address book according to claim 2, wherein the user address book update request is a request for updating the entire user address book.

5. The method for processing an address book according to claim 2, wherein the user address book update request is a request for updating a contact in the user address book.

6. The method for processing an address book according to claim 1, wherein after the parsing of the user address book, and generating the acquisition request according to the settings of the user address book and the needed updated contact information, the method further comprises:

sending the acquisition request to the different service engine server.

7. The method for processing an address book according to claim 6, wherein the acquiring the contact information to be updated according to the acquisition request, and updating the user address book comprises:

combining the acquired contact information to be updated with other contact information in the user address book, so as to update the user address book.

8. The method for processing an address book according to claim 1, wherein the synchronizing the updated information of the user address book to the UE is implemented through at least one of: timing synchronization; event-triggered synchronization; or synchronization each time the contact information in the address book is changed.

9. The method for processing an address book according to claim 1, wherein the information file of the UE is stored in the NAB, and when the UE registers with an Internet Protocol (IP) Multimedia Subsystem (IMS) network, the NAB acquires equipment information of the user through third-party registration, and adds the equipment information of the user to the information file of the UE.

10. A computer program product, comprising one or more non-transitory computer readable storage medium that store one or more computer executable instructions thereon that when executed cause the computer program product to:

receive an update request for updating at least a portion of a user address book that includes a contact list with contact information for one or more contacts;

based on the received update request, parse the user address book for determining if updated contact information is needed from a different service engine server;

based on one or more settings in the user address book, determine that updated contact information is needed for the one or more contacts from a different service engine server and generating an acquisition request according to settings of the user address book and the needed updated contact information;

acquire from the different service engine server contact information to be updated according to the acquisition request;

based on the received contact information, update the user address book;

synchronize a user address book client by transmitting at least updated information of the user address book to a user equipment (UE); and parse an information file of the UE, and synchronizing by transmitting the updated information of the user address book to other equipment of the user according to the information file of the UE.

11. The computer program product of claim 10, wherein the UE accesses and manages the NAB via at least one of: an Extensible Markup Language (XML) Configuration Access Protocol (XCAP); a Session Initiation Protocol (SIP); or a Data Synchronization (DS) Protocol.

12. The computer program product of claim 10, wherein the service engine server is a presence server and the NAB acquires presence information of a contact through a PRS-2 interface with an SIP/IP Core and a PRS-3 interface between the SIP/IP Core and the presence server.

13. The computer program product of claim 10, wherein the service engine server is a Shared XML Document Management Server, XDMS, and the NAB acquires basic information of a contact through an interface with the Shared XDMS by using comprising at least one of an Extensible Markup Language, XML, Configuration Access Protocol, XCAP, and a Session Initiation Protocol, SIP.

14. The computer program product of claim 10, wherein the service engine server is a location server and the NAB acquires location information of a contact through an interface with the location server by using a Mobile Location Protocol, MLP.

* * * * *